Feb. 12, 1946. A. B. AUERHAAN 2,394,653
UNIVERSAL SPLINT
Filed April 12, 1943 3 Sheets-Sheet 1
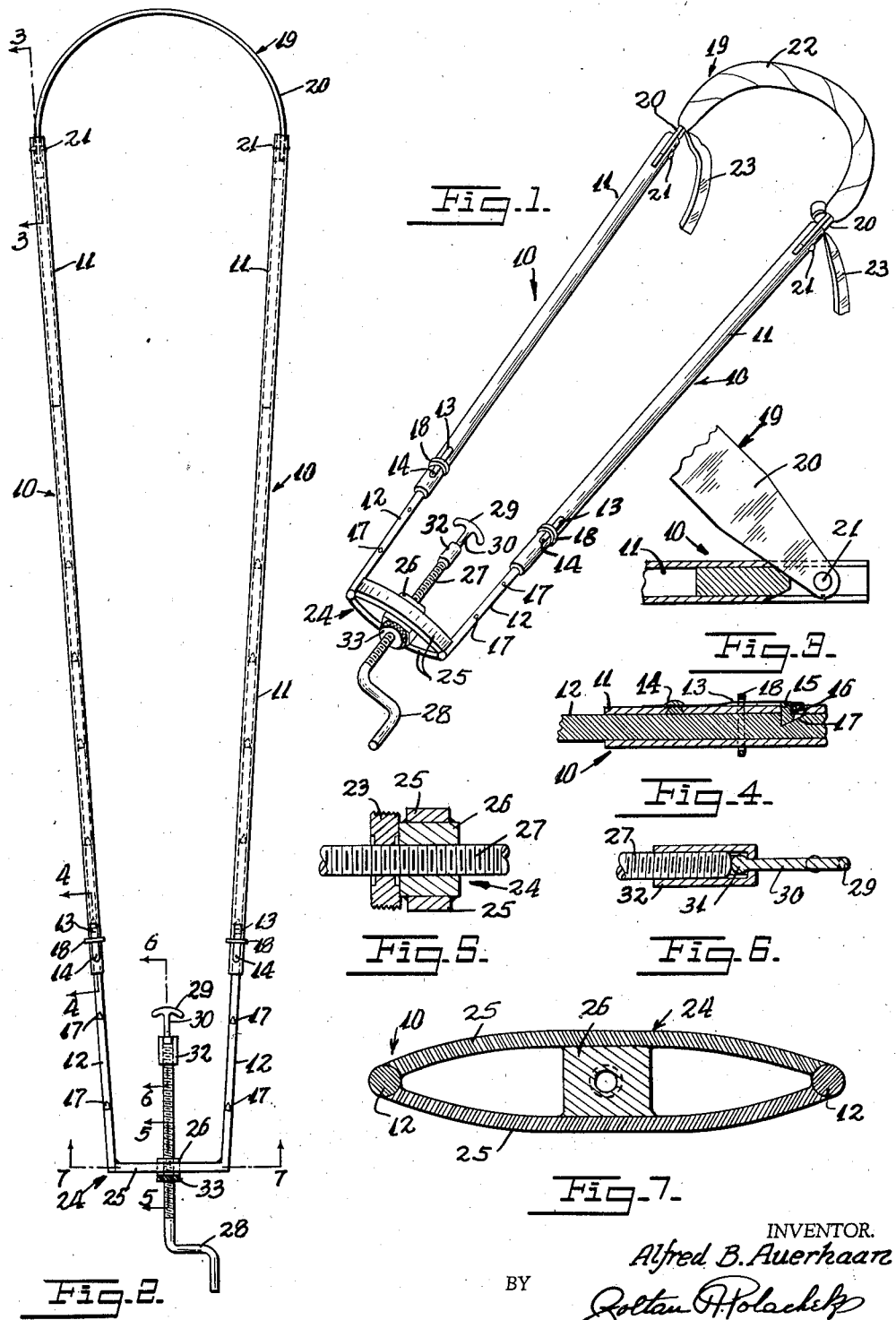
INVENTOR.
Alfred B. Auerhaan
BY
Zoltan H. Polachek
ATTORNEY

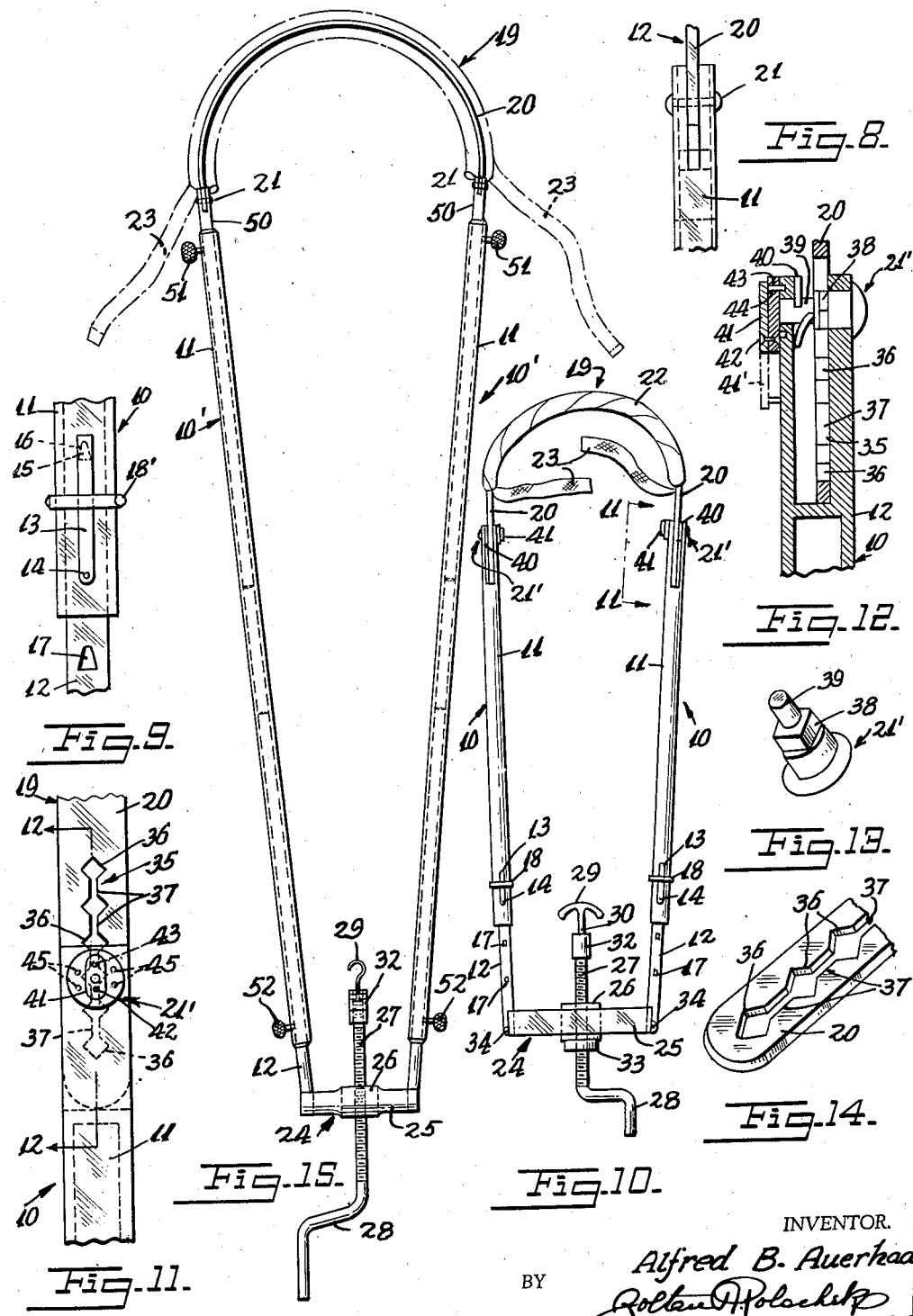

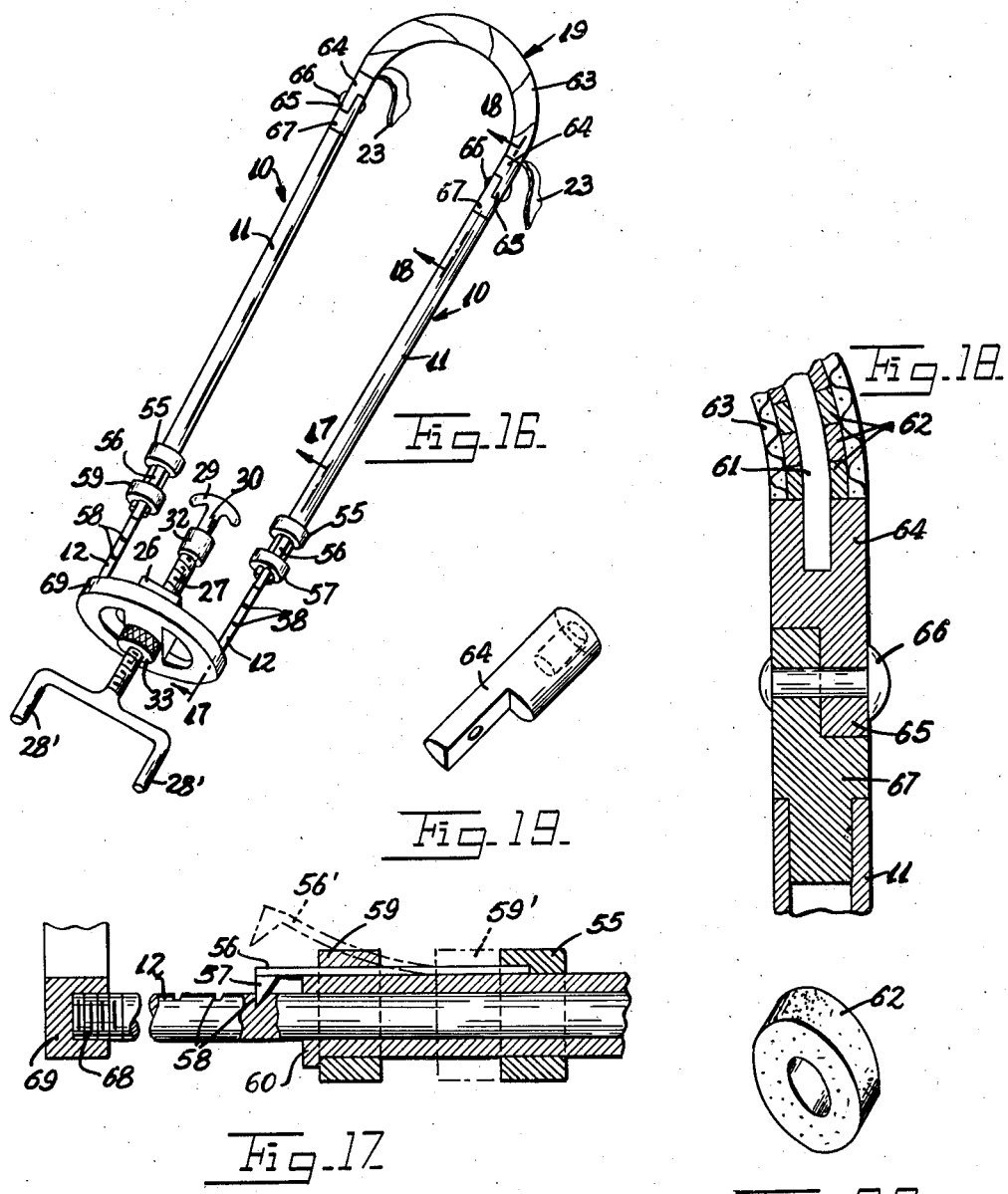

Patented Feb. 12, 1946

2,394,653

UNITED STATES PATENT OFFICE 2,394,653

UNIVERSAL SPLINT

Alfred B. Auerhaan, Brooklyn, N. Y.

Application April 12, 1943, Serial No. 482,675

2 Claims. (Cl. 128—85)

This invention relates to new and useful improvements in a splint for mending broken bones in arms and legs.

More specifically, the invention proposes the construction of a splint for mending broken bones in arms and legs characterized by a pair of extendable arms for extension along the sides of the limb having the broken bone to retain the arm extended as will be hereinafter described.

Another object of the invention proposes providing one of the ends of the side arms with an arcuate padded member adapted to be engaged upon the limb on one side of the break and to provide the other ends of the side arms with a threadedly rotatively supported screw adapted to be connected with bandages mounted on the limb on the other side of the break in a manner to pull the arm when the screw is turned to align the broken bone sections.

Still further it is proposed to provide the inner end of the screw with a hook over which the bandages are adapted to be engaged for connecting the bandages with the screw.

A still further object of the invention proposes mounting the hook rotatively upon the inner end of the screw in a manner to permit the screw to be freely turned while the hook is held against turning by its engagement with the bandages.

Still another object of this invention proposes mounting the ends of the padded member adjustably upon the ends of the extendable side arms in a manner to permit them to be extended and retracted with relation to the ends of the side arms to control the spacing of the ends of the side arms to project along the side of limbs having different diameters.

It is still further an object of this invention to construct a splint for mending broken bones in arms and legs which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a splint for mending broken bones in arms and legs constructed in accordance with this invention.

Fig. 2 is a plan view of Fig. 1.

Fig. 3 is an enlarged sectional view on the line 3—3 of Fig. 2.

Fig. 4 is an enlarged sectional view on the line 4—4 of Fig. 2.

Fig. 5 is an enlarged sectional view on the line 5—5 of Fig. 2.

Fig. 6 is an enlarged sectional view on the line 6—6 of Fig. 2.

Fig. 7 is an enlarged sectional view on the line 7—7 of Fig. 2.

Fig. 8 is an enlarged detailed view of a portion of Fig. 2.

Fig. 9 is an enlarged detailed view of a portion of Fig. 2.

Fig. 10 is a view similar to Fig. 2 but illustrating a splint constructed in accordance with a modification of this invention.

Fig. 11 is an enlarged detailed view looking in the direction of the line 11—11 of Fig. 10.

Fig. 12 is a longitudinal sectional view taken on the line 12—12 of Fig. 11.

Fig. 13 is a perspective view of a portion of the pivot pin per se.

Fig. 14 is a perspective view of one end of the arcuate padded member.

Fig. 15 is another view similar to Fig. 2 but illustrating a splint constructed in accordance but with a still further modification of this invention.

Fig. 16 is a perspective view of a splint constructed in accordance with another form of this invention.

Fig. 17 is a fragmentary enlarged sectional view taken on the line 17—17 of Fig. 16.

Fig. 18 is a fragmentary enlarged sectional view taken on the line 18—18 of Fig. 16.

Fig. 19 is a perspective view of one of the brackets shown in Fig. 18.

Fig. 20 is a perspective view of one of the felt washers shown in Fig. 18.

The splint for mending broken bones in arms and legs, according to this invention, includes a pair of extendable side arms 10. Each of these arms 10 consists of a tubular section 11 and a solid rod 12 slidably extended into one end of the tubular section 11. Means is provided upon each of the tubular sections 11 for holding the rods 12 in various extended positions. This means is characterized by a leaf spring 13 upon each of the tubular sections 11. Each leaf spring 13 has one of its ends fixedly attached to its respective tubular member 11 by means of rivet 14.

The free ends of the leaf springs 13 are formed with projections 15 which extend to the interior of the tubular sections through openings 16 formed in the sides thereof. These projections 15 are engageable with complementary recesses 17 formed in the rods 12 to lock the rods against movement relative to the tubular sections 11. Rings 18 are slidably mounted on the tubular members and are engageable about the intermediate portions of the springs 13 to hold the springs from accidentally flexing and withdrawing the projections 16 from the recesses 17.

An arcuate padded member 19 is mounted between adjacent ends of the side arms 10 and is adapted to engage partially about the break engaging the limb on one side of the break. This padded member 19 is constructed of an arcuate piece of spring steel 20. The ends of the piece of spring steel 20 are extended into cutouts 21 formed in the ends of the tubular sections 11 of the arms 10, so that portions of the spring steel 20 and the ends of the tubular section 11 will be overlapped. Rivets 21 pass through the overlapped portions of the spring steel 20 and the tubular sections 11 for pivotally connecting the spring steel 20 with the tubular sections 11.

The piece of spring steel 20 intermediate of its pivotally supported ends is provided with padding material 22 which is adapted to engage the limb and prevent injury to the flesh thereof. Tapes 23 extend from the ends of the padding material and are adapted to be tied about the limb for maintaining the padded arcuate member 19 in position upon the limb on one side of its break.

A bracket 24 is mounted between the other ends of the side arms 10. This bracket 24 is formed of a pair of oppositely arced pieces of metal 25 which have their ends welded, brazed or in any other manner secured to the outer ends of the rods 12.

A block 26 is disposed and welded in position between the adjacent faces of the pieces of metal 25. A screw 27 is threadedly engaged through the block 26 and its outer end bent into a handle 28 by which the screw 27 may be turned relative to the block 26.

The inner end of the screw 27 carries a hook 29 which is adapted to be engaged with bandages mounted upon the limb on the side of the break opposed to the side engaged by the padded arcuate member 19. The hook 29 continues into a shank 30 having a knob 31 formed upon its end. This knob is located within a cap 32 threadedly mounted upon the free end of the screw. The inter-engaged knob 31 and cap 32 rotatively connect these parts so that the screw 27 may be turned while the hook 29 is being held by its engagement with the bandages. A lock nut 33 is mounted upon the screw 27 and is adapted to be tightly engaged against the adjacent end of the block 26 for locking the screw 27 in various turned adjusted positions relative to the block 26.

The manner of using the splint is as follows: The padded arcuate member 19 is engaged about the limb above the break and the tapes are tied about the limb for holding the arcuate member in position. With the side arms 10 extended along the sides of the broken limb they are adjusted in length so the hook 29 will be disposed along the arm on the side of the break opposed to the side engaged by the padded arcuate member. By means of bandages the hook 29 is then connected to the limb. The handle 28 is then turned for moving the screw 27 outwards relative to the block 26. This will pull on the hook and stretch the broken limb and align the broken sections of the bone.

In Figs. 10 to 14 a modification of the invention is disclosed in which the ends of the rods 12 are pivotally attached to the free ends of the arced metal members 25 forming the bracket 24 by means of pins 34. The ends of the spring steel member 20 of the padded arcuate member 19 are adjustably connected with the ends of the tubular sections 11 of the side arms 10. This adjustment permits the ends of the steel member 20 to be extended and retracted with relation to the ends of the tubular sections 11 to cause these ends to be spread as the side arms pivot about the pins 34 to space the side arms to extend along the sides of limbs of different thicknesses.

To accomplish this the free ends of the spring steel member are formed with elongated slots 35. Each slot 35 comprises a plurality of square openings 36 which are connected with each other by narrow slot portions 37. The rivets 21' which pass through the overlapped portions of the spring steel members 20 and the ends of the tubular sections 11 each have an intermediate square portion 38 and a narrow round portion 39. Normally, the square portion 38 engages one of the square openings 36 for fixedly holding the spring steel member in a desired adjusted position. A split washer 40 is mounted on the reduced narrow round portion 39 and acts between a portion of the tubular section 11 and the ends of the spring steel member to urge the end of the spring steel member 20 towards the square portion 38.

It will be understood that the ends of the spring steel member may be urged away from the square portions 38 against the action of the split washers 40. This movement will align the slots 35 with the narrow round portions 39 of the rivets 21' and permit the ends of the spring steel member 20 to be extended or retracted relative to the tubular sections with the narrow round portions 39 of the rivets passing through the narrow slot portions 37.

The ends of the rivets 21' rotatively engage the ends of the side arms 10 and when the square openings 36 of the slots 35 engage the square portions 38 of the rivets 21' the padded member 19 will still be able to pivot relative to the side arms 10. However, means are provided for locking the padded arcuate member 19 in various pivoted positions relative to the side arms 10.

This latter means comprises a leaf spring 41 having one end pivotally mounted upon one head of the rivet 21'. This pivotal mounting is accomplished by a small rivet 42. The free end of the leaf spring 41 carries a small pin 43 which may be extended through an opening 44 formed in the head of the rivet 21'. The free end of the small pin may be then engaged with one of a plurality of small recesses 45 formed in the face of the tubular section 11 adjacent the head of the rivet 21' which carries the leaf spring 41. The spring 41 may be manually flexed to disengage the pin 43 from the opening 44 and the spring 41 may then be pivoted to the inoperative position illustrated by the dot and dash lines 41' in Fig. 12. In this latter position the padded member 19 is free to pivot relative to the side arms 10.

In using the splint as shown in this form of the invention, movement of the ends of the spring steel member 20 outwards relative to the ends of the side arms 10, will permit the side arms to move apart about the pins 34. On the other hand, if the ends of the spring steel member 20 are moved inwards relative to the ends of the side arms, the side arms will be pivoted inwards about the pins 34 and be drawn closer together. It is thus possible to adjust the spacing of the side arms 10 to meet the requirements of limbs of different diameters.

In other respects this form of the invention is similar to the previous form and like reference numerals identify like parts in each of the several views.

In the form of the invention shown in Fig. 15, the spring steel member 20 of the padded arcuate member 19 has its ends pivotally attached to rods 50. These rods 50 are then slidably extended into the ends of the tubular sections 11 of the side arms 10'. Thumb screws 51 are threadedly engaged through the walls of the tubular section 11 of the side arms 10' and abut the rods 50 for holding the rods in various adjusted extended positions relative to the tubular sections 11.

The solid rods 12 are slidably extended into the other ends of the tubular sections 11 of the side arms 10' and are held in various adjusted fixed positions by means of thumb screws 52 which threadedly engage through the walls of the opposite ends of the tubular sections 11.

In other respects this form of the invention is also similar to the previous forms and like reference numerals identify like parts in each of the several views.

In Figs. 16 to 20 another modified form of the invention is disclosed. In this form the splint includes a pair of extendable side arms 10. Each of these arms consists of a tubular section 11 and a solid rod 12 slidably extended into one end of the tubular section. A ring 55 is fixedly mounted on the inner end of each tubular section 11 and supports a leaf spring 56 which is provided with a bolt projection 57 cooperative with any one of a plurality of niches 58 formed along the rod 12. A ring 59 is slidably mounted on the end of each tube 11 and is restrained from falling off by a small flange 60. When this ring 59 is in its inoperative position, the one illustrated by the dot and dash lines 59', the leaf spring 56 is free to flex, as indicated by the dot and dash lines 56', and the projection 57 is then free from the recess 58. This permits the tubular section 11 and the rod 12 to be relatively adjusted.

An arcuate padded member 19 is mounted between the ends of the side arms 10 and is constructed from an arcuate core of spring steel 61 supporting a plurality of closely spaced felt washers 62 which are covered by a strip of cloth material 63. Brackets 64 are permanently attached upon the ends of the steel core 61 and serve to hold the washers 62 in position. The brackets 64 have reduced outer ends 65 which are pivotally connected by pintles 66 with brackets 67 mounted on the outer ends of the tubular section 11. Cloth straps 23 are attached to the cloth covering material 63 in the vicinity of the brackets 64.

The outer ends of the rods 12 are formed with threads 68 which threadedly engage into a bracket 69. A block 26 is disposed in between the sides of the bracket 24 and is welded fixedly in position. A screw 27 threadedly engages through the block 26. This screw is provided with a double handle 28' by which it may be turned. The inner end of the screw 27 carries a hook 29 which has a shank 30 rotatively mounted upon the end of a cap 32 which is mounted on the end of the screw 27. A lock nut 33 threadedly engages the screw 27 and abuts the block 26.

The manner of using this splint is substantially identical to the forms previously described.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A splint for mending broken bones in arms and legs, comprising a pair of extendable side arms, an arcuate padded member mounted between one of the ends of said side arms and adapted to engage partially above a limb, a bracket mounted between the other ends of said side arms, and a screw threadedly extended through said bracket and adapted to be connected with bandages on said limb, said arcuate padded member comprising a piece of spring steel having its ends piviotally attached to the ends of said side arms, and padding material wound upon said piece of spring steel intermediate of its pivotally mounted ends, said side arms having their ends pivotally attached to said bracket, and means for extendably and retractably connecting the ends of said piece of spring steel with the ends of said side arms to control the spacing of said side arms as the ends of said piece of spring steel are adjusted in and out, comprising elongated slots formed in the ends of said spring steel member and each comprising a plurality of square openings connected together by narrow slot portions, rivets pivotally supporting the ends of said piece of spring steel, each rivet comprising a square portion normally engaging one of said square openings and a narrow round portion adapted to be passed through said narrow slot portions for selectively aligning said square portion with desired square openings, and means urging the ends of said piece of spring steel into positions in which one of said square openings will be engaged with each of said square portions.

2. A splint for mending broken bones in arms and legs, comprising a pair of extendable side arms, an arcuate padded member mounted between one of the ends of said side arms and adapted to engage partially above a limb, a bracket mounted between the other ends of said side arms, and a screw threadedly extended through said bracket and adapted to be connected with bandages on said limb, said arcuate padded member comprising a piece of spring steel having its ends pivotally attached to the ends of said side arms, and padding material wound upon said piece of spring steel intermediate of its pivotally mounted ends, said side arms having their ends pivotally attached to said bracket, and means for extendably and retractably connecting the ends of said piece of spring steel with the ends of said side arms to control the spacing of said side arms as the ends of said piece of spring steel are adjusted in and out, comprising elongated slots formed in the ends of said spring steel member and each comprising a plurality of square openings connected together by narrow slot portions, rivets pivotally supporting the ends of said piece of spring steel, each rivet comprising a square portion normally engaging one of said square openings and a narrow round portion adapted to be passed through said narrow slot portions for selectively aligning said square portion with desired square openings, and means urging the ends of said piece of spring steel into positions in which one of said square openings will be engaged with each of said square portions, and means for locking said rivets against turning to hold said padded member against pivoting when certain of said square openings are engaged with said square portions.

ALFRED B. AUERHAAN.